Sept. 11, 1956　　　　J. J. SLOYAN　　　　2,762,661
MACHINERY SUPPORTS
Filed March 29, 1952　　　　　　　　2 Sheets-Sheet 1
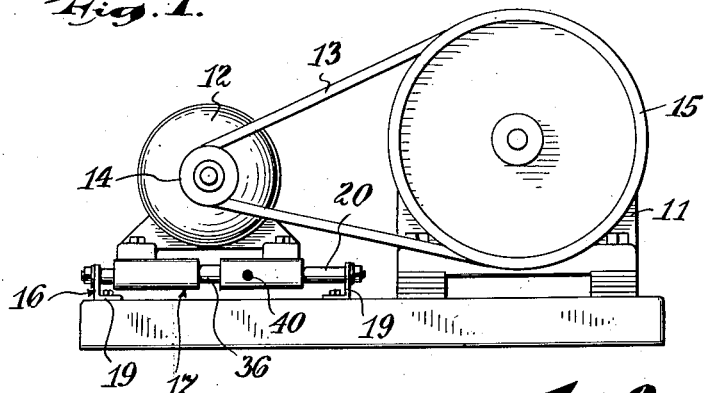
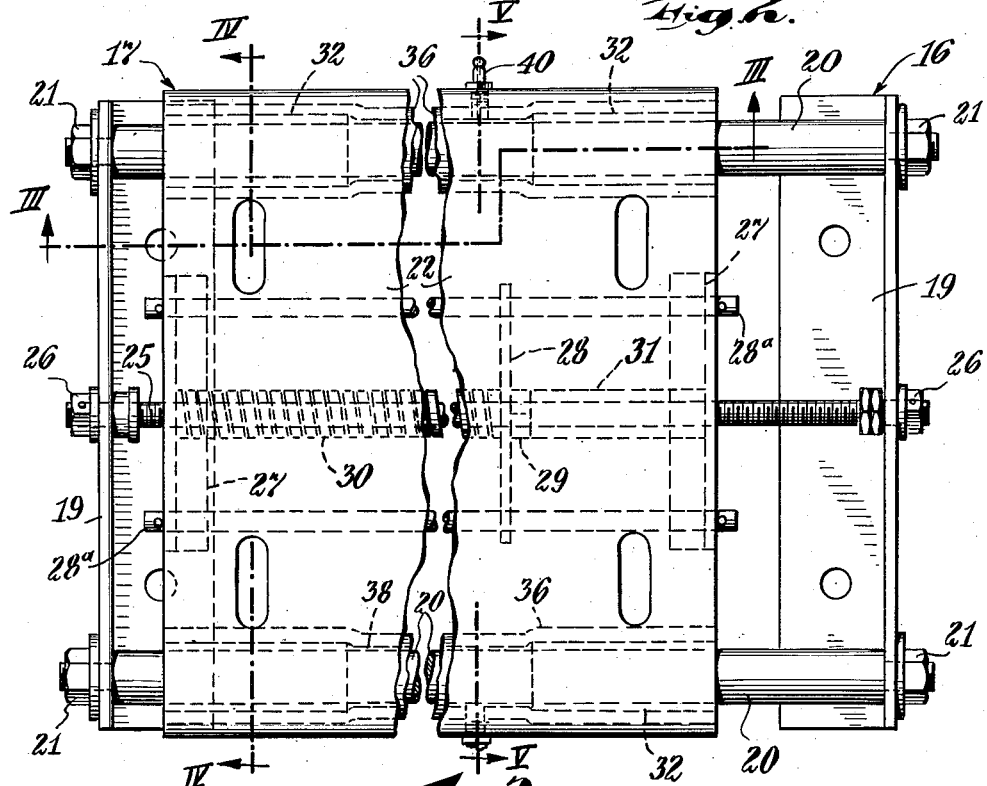
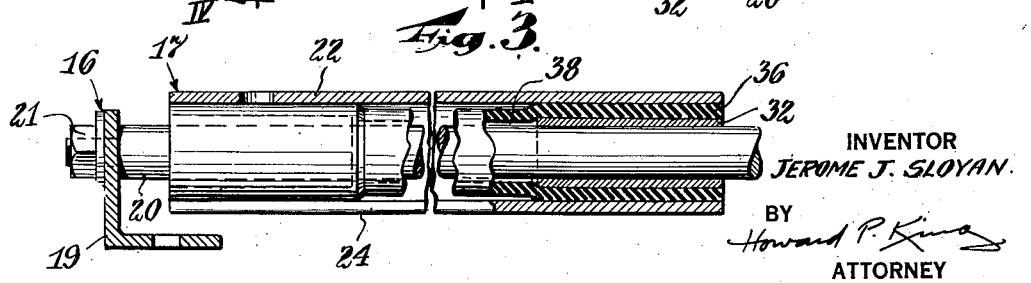
INVENTOR
JEROME J. SLOYAN.
BY
Howard P. Kima
ATTORNEY Sept. 11, 1956  J. J. SLOYAN  2,762,661
MACHINERY SUPPORTS
Filed March 29, 1952  2 Sheets-Sheet 2
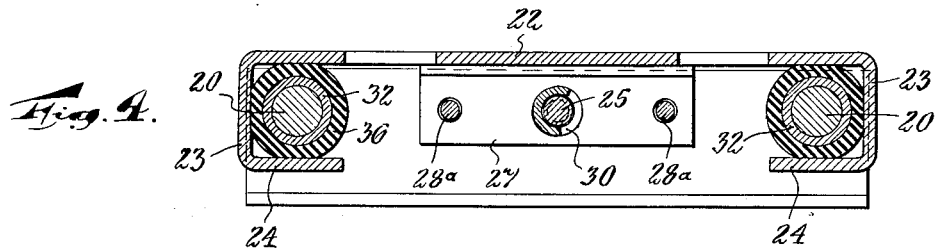
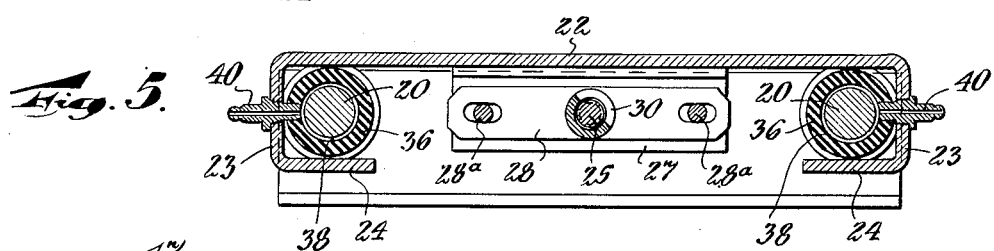
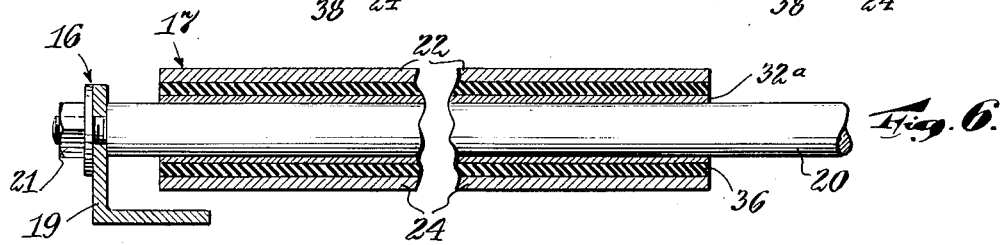
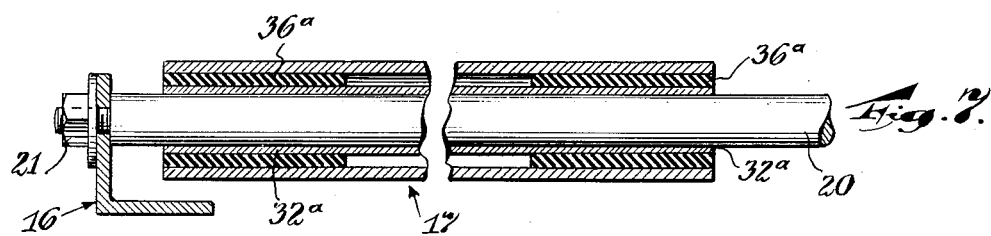
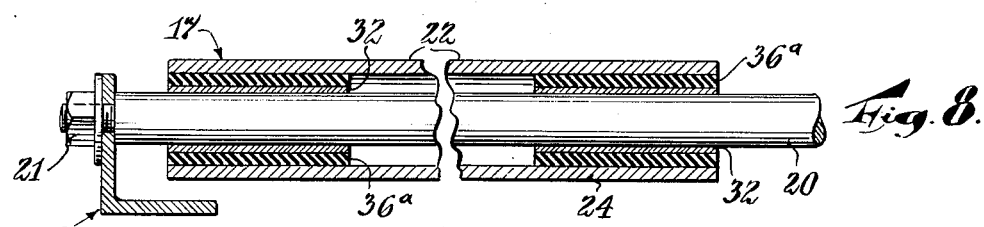
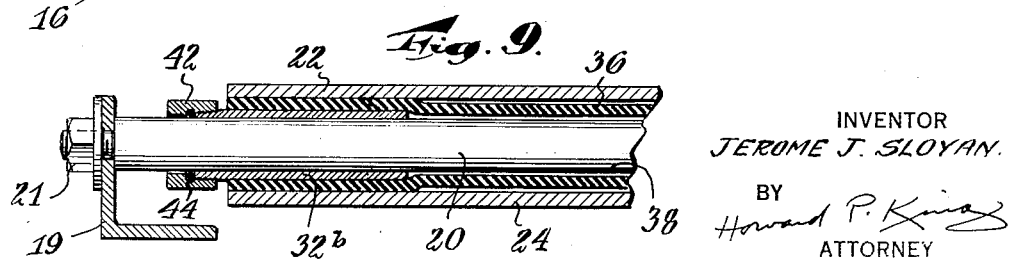
INVENTOR
JEROME J. SLOYAN.
BY Howard P. King
ATTORNEY

United States Patent Office 2,762,661
Patented Sept. 11, 1956

2,762,661
MACHINERY SUPPORTS
Jerome J. Sloyan, Bloomfield, N. J.

Application March 29, 1952, Serial No. 279,314

4 Claims. (Cl. 308—5)

My invention relates to supports, and more particularly to supports having a movable carriage slidable in use on fixed rails.

Devices of this character are commonly utilized for mounting machinery, such as an electric motor, so as to afford latitude of adjustment, or movement for other purposes, of a machine, or part of a machine, in its relation to another machine or machine part. Often, as with a motor driving a machine through the agency of a belt, there is present a recurring variation in belt tension or power absorption which introduces reaction of varying characteristics on contact of the carriage with its rails. This results in chatter, clicking or other noise, wear from constant thumping, and stresses and strains due to vibrations which are transmitted to and through the carriage mounting. Any attempt to eliminate vibration and chatter must utilize a means which does not interfere with the free movement of the carriage on the fixed rails. Preferably a metal-to-metal contact should be retained between the sliding engagement, and lubrication therebetween is also desirable.

Accordingly, the fundamental object of this invention is to provide an improved adjustable movable mounting for a motor or other machine or machine part.

Generally, an object of this invention is to provide a movably mounted carriage which eliminates undesirable vibration and chatter.

Another object of the invention is to provide a movably mounted carriage which shall be durable and relatively free from friction between the movable parts.

A further object of the invention, consistent with the foregoing, is to provide an improved movable carriage wherein it is not necessary to have close tolerance between the rails and the carriage body.

Specifically, it is an object of the invention to provide in conjunction with precision engagement of carriage and rails a resilient adapter for accommodating the carriage to said precision engagement with the rails and to quench chatter.

Other objects of the invention will appear to those skilled in the art to which the invention appertains as the description proceeds, both by direct reference thereto and by inference from the context.

Referring to the accompanying drawings, wherein like numerals of reference indicate similar parts throughout the several views:

Figure 1 is an elevational view of a motor-driven machine wherein the motor is mounted on a support embodying my invention;

Fig. 2 is a plan view of the support of Fig. 1;

Figs. 3, 4, and 5 are sectional views taken respectively along lines III—III, IV—IV, and V—V of Fig. 2; and Figs. 6, 7, 8, and 9 are longitudinal elevational views of modifications of my resilient movable mounting taken along the axis of one of the rails supporting the carriage.

Fig. 1 of the drawing illustrates a specific use of my invention with a machine, such as a pump 11, driven by an electric motor 12 through a belt 13. The belt 13 encircles the driving pulley 14 on one end of the armature shaft of the motor 12 and the driven pulley 15 on the shaft of the pump 11.

The motor is secured on the support of the present invention, said support comprising generally a fixed or basal portion 16 and a movable carriage 17 mounted on the fixed portion. Said fixed or basal portion is shown as comprising a pair of spaced parallel cleats 19 adapted to be secured to any appropriate surface. Between these cleats, next the ends thereof, is a pair of parallel rails 20 with the ends of the rails securely held by the cleats, and assembled so that the rails and cleats form a rectangle of which the cleats will arbitrarily be referred to as the ends and the rails as the sides of the rectangular assembly.

The rails, as here shown, are cylindrical rods of desired and adequate diameter, the ends of the rods being reduced and threaded, so as to protrude through holes in the cleats 19 and provide a shoulder for engagement against the cleats to which the rods are rigidly secured by nuts 21 on the threaded ends. Rods of this character are readily obtainable having very smooth uniform circumferential faces of very exact diameter.

The carriage 17 includes a body 22, which may conveniently be a strong sheet of metal, such as sheet steel of adequate size and rigidity to support the motor, said body extends crosswise from one rail to the other, overlying both rails and having its side margins bent down, as at 23, at the outside of and then under said rails to provide an inturned flange 24 under each rail. This structure comprises in its entirety a rail-receiving means or housing extending at least half way around the rail thereby providing opposed portions at diametrically opposite parts of the rail. The motor 12 is fastened to the upper side of said body by bolts, or otherwise.

With some installations, a directly connected worm drive is employed for moving the carriage and holding it in desired position, and in others a spring loading is provided with the worm applying the desired tension on the springs. Both systems are old in the art, but for illustrative purposes, the spring-loaded construction has been arbitrarily selected for the present showing. Accordingly, it will be observed that between and parallel to the rails is a worm 25 extending from cleat to cleat and rotatably mounted therein but held against moving longitudinally by means of nuts 26 on the opposite ends of the worm pinned thereto, or otherwise made fast thereon.

On the underside of the carriage body, preferably one next to each margin thereof nearest the cleats, are two L-brackets 27 of which one leg of each is flatwise of and welded to the carriage, and of which the other leg depends from the carriage in a plane transverse to the said worm. The worm 25 freely passes through holes in the depending legs of brackets 27. Intermediate the brackets 27 is a transverse bar 28 through which the screw freely passes. The bar 28 is backed by a nut 29 which is fixed to the bar.

Between the bar 28 and the bracket 27 on the side of the bar away from the nut 29, is a coiled compression spring 30 which is concentric with and situated on the worm 25. A length of rubber or other tubing 31 is also provided on the worm 25 extending from the nut 29 to the other bracket 27. By turning the worm 25, the nut 29 will move along the screw causing the carriage to follow due to the forces applied either to the compression spring or tubing. The bar 28 is prevented from rotating by parallel guide rods 28a, which pass through holes in each end of the bar and which extend from one bracket to the other and are supported thereby.

The essential feature of my invention comprises more particularly means for slidably mounting the carriage on the rails. Precision fit of the sliding engagement is highly desirable, but from a practical standpoint it is extremely difficult, if at all possible, to fit a plate directly on the rails with the requisite precision engagement. According to the present invention precision sliding engagement is obtained by utilization of accurately bored bearing members or sleeves 32 riding upon the rails in circumferential engagement therewith. These sleeves are preferably metal, and while precision made to have fitting engagement with the rails, are, nevertheless, slidable thereon.

The specific showing of sleeves 32 in Figs. 2 to 5 provides two sleeves on each rail next the end edges of the carriage body, and with a considerable gap between the inner ends of the sleeves. This structure will therefore permit the body to be adjusted for length by utilization of a body split transverse to the rails.

The outer ends of the sleeves 32 are shown as in a location even with the ends of the carriage body 22. Encompassing and extending between the sleeves 32 on each rail, in the showing of Figs. 2 to 5, is a resilient tube 36, preferably of rubber or other suitable composition. The tube, sleeves and rail are coaxial. The housing or rail-receiving means which is here shown as a U-channel formed by the lateral edges of the carriage body 22, receives the tube longitudinally therein and is of such dimensions as to apply a compressional force to the resilient tube 36 between the upper body portion and the inturned flange 23.

While the sleeves 32 are preferably of metal, other hard material may be substituted if desired. The inside diameter of each sleeve 32 is machined so as to effect a close fit between the cylindrical rail 20 and the sleeve thereby assuring easy sliding on the rail and an absence of play between the sleeve and the rail. The sleeves consequently function as bushings and are made long enough so that the force per unit area does not exceed allowable limits. Likewise the sleeve or bushing is made of material heavy enough to withstand the compressional force of the U-channel or other housing and the resilient tubing.

Inasmuch as the sleeves or bushings 32 do not extend the length of the rails 20, there is a space 38 within the mid-section of the tube and between the inner ends of said sleeves which provides a lubricant reservoir. A lubrication fitting 40 for supplying lubricant to the space 38 is mounted in the resilient tube 36 between the sleeves 32.

The above-described mode of supporting the carriage body 22 on the rails 20 prevents chattering and the transmission of vibration from the carriage to the rails 20 and supporting cleats 19.

It should be noted that the tubing is not subjected to relative movement between it and other parts, thereby assuring a longer life for the tubing, and furthermore may be readily cut to proper length to match the adjusted length of the carriage body.

In the modification of Fig. 6, a single sleeve or bushing 32a for each rail replaces the above-described pair of sleeves, said single sleeve extending the full length of the resilient tubing 36. This single sleeve, being longer than the previously described pair of sleeves, distributes the forces between the sleeve and the rail over a larger area, which is desirable under conditions of a heavy load on the carriage.

The modification of Fig. 7 utilizes two sections 36a of resilient tubing, instead of a single tube as above-described, and a sleeve 32a extending the length of the carriage body 22 as in the modification of Fig. 6. One section of tubing 36a is located at each end of the sleeve 32a. Each section 36a is long enough to assure proper cushioning between the carriage body and rails 20.

In the modification of Fig. 8 the structure is the same as in Fig. 3 with the exception that the resilient tubing does not extend the length of the carriage body 22. Instead, each sleeve 34 is encompassed with a section of resilient tubing 36a approximately co-extensive with the length of the sleeve.

Generally, the sleeve 32 or 32a can be machined to close tolerances and the fit between the sleeve and the rail made close enough to prevent foreign substances from lodging between the sleeve and the rail and also close enough to prevent lubricant from leaking from the lubricant reservoir 38. If desired, though, additional protection may be gained through the use of a packing box as shown in Fig. 9. In this modification the sleeve 32b extends beyond the carriage body and the resilient tubing 36. The extension is threaded so that a packing nut 42 can be screwed onto the protruding end of the sleeve. The packing nut 42 has a hole in the end thereof to allow the rail 20 to pass slidably therethrough. Packing material 44 is provided within the nut and contiguous to the end of the sleeve, encircling the rail 20, and is compressed adequately by the nut to seal the end of said sleeve in sliding relation to the rail.

While the rails, sleeves and resilient tubing as illustrated and described are cylindrical, the invention is not limited to such a configuration, and by way of explanation, a rail, sleeve, and tubing ellipsoidal in cross-section as one example could be substituted.

Furthermore, while the rail-receiving means or housing has been shown as a U-channel formed by bending the lateral portions of the carriage body about the tubing, it will be obvious to one skilled in the art that a separate channel can be provided which is welded to the underside of the carriage. The horizontal U-cross-section may be reversed so that the open part of the U is along the outside edge of the carriage or the channel can be welded so that in position it forms an inverted U. While the description has made specific reference to a U-shaped channel, any shape housing which will apply a compressional force to the tubing and hold the carriage body and sleeves assembled can be used. The described embodiment is preferred since it is simple and facilitates production.

It will be seen from the above that I have provided a movable support mounted on two parallel rails wherein chatter and vibration between the rail and the carriage are eliminated. I have also provided a chatter and vibration eliminating means which is durable, inexpensive to manufacture, and yet capable of being manufactured to close tolerances where necessary to produce relatively frictionless sliding surfaces, and which is easily lubricated to reduce friction.

I claim:

1. A support comprising a longitudinal rail, two aligned sleeves on and in slidable engagement with said rail and concentric therewith, a resilient tube concentric with and about said sleeves extending from one sleeve to the other, a rail-receiving means at least partially encompassing said tube and applying a compressional force thereto, and a carriage body comprising a fixed part with said rail-receiving means and movable with said sleeve and tube on said rail.

2. The support as in claim 1 wherein said tubing has mounted therein between said sleeves a lubrication fitting and wherein each sleeve extends beyond the end of said tubing, and means thereon forming a seal between said sleeve and said rail.

3. A support comprising a longitudinal rail, a carriage body mounted to move longitudinally of said rail, said body having side margin rail-receiving means at least partially encompassing said rail, a sleeve on said rail in sliding contact therewith, said sleeve being at least in part within said rail-receiving means, the outer surface of said sleeve having a straight-line configuration longitudinally thereof parallel to the surface of said rail, and said sleeve in its entirety encompassing said rail for a part of the length of said rail, and a resilient tube having an inner surface in engagement with said outer surface of said sleeve and having an outer surface engaged at least in part by said rail-receiving means and compressed between said means and sleeve, whereby the surface friction between said means and tube and between said tube and sleeve is rendered solely sufficient to prevent longitudinal displacement of location of said sleeve in said side margin rail-receiving means.

4. A support comprising a cylindrical rail, a carriage body mounted to move longitudinally of said rail, said body having side margin rail-receiving means at least in part encompassing said rail, a coaxial cylindrical sleeve on said rail in longitudinally sliding contact therewith, said sleeve being at least in part within said rail-receiving means, the outer surface of said sleeve being a true cylinder with straight-line configuration longitudinally thereof from end to end and with equal wall thickness throughout its length, and a resilient tube having a cylindrical inner surface coaxial to and on said sleeve in engagement with the outer cylindrical surface of said sleeve and having an outer surface engaged at peripherally spaced-apart areas thereof by said rail-receiving means and compressed thereat and thereby between said means and said sleeve, whereby the surface friction between said means and tube and between said tube and sleeve is rendered solely sufficient to prevent longitudinal displacement of location of said sleeve both in said side margin rail-receiving means and on said tube.

References Cited in the file of this patent
UNITED STATES PATENTS

| | | |
|---|---|---|
| 1,878,983 | Harris | Sept. 20, 1932 |
| 2,196,891 | Berndt | Apr. 9, 1940 |
| 2,196,892 | Berndt | Apr. 9, 1940 |
| 2,477,221 | Von Bolhar | July 26, 1949 |
| 2,580,119 | Meyers | Dec. 25, 1951 |